(12) United States Patent
Kubo et al.

(10) Patent No.: US 6,539,709 B2
(45) Date of Patent: Apr. 1, 2003

(54) EXHAUST GAS PURIFYING SYSTEM OF INTERNAL COMBUSTION ENGINE

(75) Inventors: Kengo Kubo, Yokohama (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/838,283

(22) Filed: Apr. 20, 2001

(65) Prior Publication Data

US 2001/0037643 A1 Nov. 8, 2001

(30) Foreign Application Priority Data

May 2, 2000 (JP) ........................................ 2000-133191

(51) Int. Cl.$^7$ ................................................. F01N 3/10
(52) U.S. Cl. ........................ 60/301; 60/285; 423/239.1
(58) Field of Search .......................... 60/274, 285, 299, 60/301; 422/171, 177, 180; 423/213.2, 213.5, 213.7, 239.1

(56) References Cited

U.S. PATENT DOCUMENTS

| | | | |
|---|---|---|---|
| 5,412,945 A | | 5/1995 | Katoh et al. .................. 60/285 |
| 5,658,543 A | * | 8/1997 | Yoshida et al. ........... 423/213.2 |
| 5,662,869 A | * | 9/1997 | Abe et al. ..................... 422/171 |
| 5,750,082 A | * | 5/1998 | Hepburn et al. ......... 423/213.5 |
| 5,811,364 A | * | 9/1998 | Suga et al. .............. 423/213.5 |
| 5,830,421 A | * | 11/1998 | Gardner et al. .......... 423/213.2 |
| 5,884,473 A | * | 3/1999 | Noda et al. ..................... 60/301 |
| 6,089,015 A | * | 7/2000 | Strehlau et al. ................ 60/301 |
| 6,139,808 A | * | 10/2000 | Mizuno et al. .............. 422/180 |
| 6,220,022 B1 | * | 4/2001 | Müller et al. .................. 60/301 |
| 6,265,342 B1 | * | 7/2001 | Lim et al. ................. 423/213.5 |

FOREIGN PATENT DOCUMENTS

| | | | |
|---|---|---|---|
| DE | 4032085 | * | 4/1992 |
| JP | 3-358125 | | 12/1991 |
| JP | 2881262 | | 2/1999 |

\* cited by examiner

Primary Examiner—Thomas Denion
Assistant Examiner—Tu M. Nguyen
(74) Attorney, Agent, or Firm—Foley & Lardner

(57) ABSTRACT

A first NOx-trapping catalyzer unit is disposed on an upstream part of an exhaust passage. A second NOx-trapping catalyzer unit is disposed on a downstream part of the exhaust passage. A structure is provided that causes the first NOx-trapping catalyzer unit to be exposed to a relatively high temperature environment and causes the second NOx-trapping catalyzer unit to be exposed to a relatively low temperature environment. Each of the first and second NOx-trapping catalyzer units traps NOx when the exhaust gas applied thereto shows a leaner air/fuel ratio and releases and reduces NOx when the exhaust gas applied thereto shows a stoichiometric or richer air/fuel ratio. The first NOx-trapping catalyzer unit shows the basicity that is higher than that of the second NOx-trapping catalyzer unit or the first NOx-trapping catalyzer shows the reducing ability that is lower than that of the second NOx-trapping catalyzer unit.

39 Claims, 4 Drawing Sheets

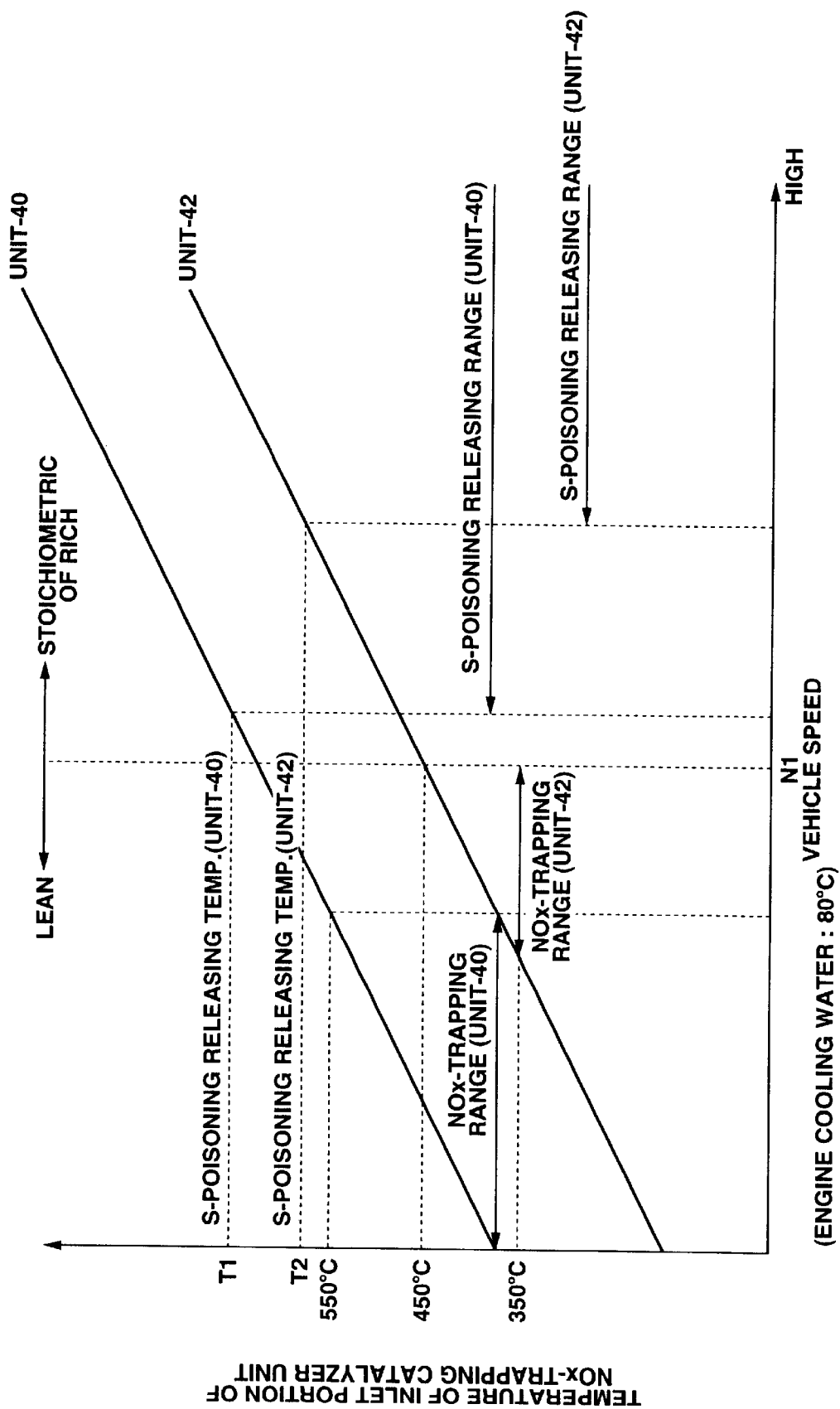

EXHAUST GAS PURIFYING SYSTEM OF INTERNAL COMBUSTION ENGINE

BACKGROUND OF THE INVENTION

1. Field of the Invention

The present invention relates to exhaust gas purifying systems of an internal combustion engine, and more particularly to the exhaust gas purifying systems of a type that can effectively purify NOx contained in oxygen-richer exhaust gas from the engine.

2. Description of the Prior Art

As is known, diesel engines and lean-burn type gasoline engines are able to exhibit a satisfied fuel consumption. However, these engines belong to a group in which purification of NOx in oxygen-richer exhaust gas is rather difficult.

For dealing with such NOx purification, Japanese Patent Second Provisional Publication 2881262 discloses an exhaust gas purifying system that has a NOx-absorbing converter installed in an exhaust passage extending from the engine. That is, when the air/fuel ratio of the exhaust gas is higher than stoichiometric (that is, leaner air/fuel ratio), the NOx-absorbing converter (more specifically, the catalyzer in the converter) absorbs NOx in the exhaust gas, while when the air/fuel ratio of the exhaust gas is lower than stoichiometric (that is, richer air/fuel ratio), the NOx-absorbing converter releases NOx therefrom allowing reduction of the same in the exhaust gas.

The publication describes the characteristics of the NOx-absorbing agent used in the NOx-absorbing converter. That is, in order to effectively absorb NOx through oxidation absorption mechanism, the publication describes a need of increasing the basicity of the NOx-absorbing agent. The publication further describes that when the basicity is increased, the reducing ability of the agent becomes lowered, which would cause discharge of NOx to the open air without reducing the same. In view of this contradiction, the publication proposes a series arrangement of two, viz., upstream and downstream NOx-absorbing catalyzer units in the exhaust passage. That is, the two NOx-absorbing catalyzer units are installed in tandem in a common converter casing, having the reducing ability of the downstream catalyzer unit greater than that of the upstream catalyzer unit. In other words, the basicity of the NOx-absorbing agent in the downstream catalyzer unit is set lower than that in the upstream catalyzer unit.

SUMMARY OF THE INVENTION

However, the above-mentioned series arrangement of the two NOx-absorbing catalyzer units fails to exhibit a satisfied NOx purifying performance throughout a sufficiently widen temperature range of the exhaust gas.

In view of the above, the applicants have carried out various examinations and tests and finally found that the basicity of the NOx-absorbing agent has a certain connection with the temperature at which the NOx-absorbing agent exhibits the maximum NOx-absorbing performance. That is, for example, if the basicity is increased, the agent can exhibit a satisfied NOx-absorbing performance in a wider temperature range from low to high temperature, while, if the basicity is weak, the agent exhibits such performance only in a lower temperature range.

In the above-mentioned series arrangement, the two NOx-absorbing catalyzer units are installed in the common converter casing. This means that under operation of the engine, the two NOx-absorbing catalyzer units having different temperature characteristics are inevitably exposed to the same temperature environment.

In practical use, the converter casing is mounted on an exhaust tube at a position remote from the engine. Thus, when, due to lower-speed operation, lean-combustion operation or the like, the engine produces exhaust gas whose temperature is not sufficiently high, both the two NOx-absorbing catalyzer units fail to be heated up to their activation temperature (viz., light on temperature) for the NOx absorption. While, if the converter casing is arranged just downstream of the exhaust manifold of the engine, both the two NOx-absorbing catalyzer units are forced to introduce high temperature exhaust gas, and thus, at least the downstream NOx-absorbing catalyzer unit can not exhibit a satisfied absorbing performance against NOx. That is, as is mentioned above, the agent in the downstream NOx-absorbing catalyzer unit has a lower basicity exhibiting the NOx-absorbing performance only in a lower temperature range.

Besides the above, in the exhaust gas from the engine, there are contained sulfur contents (S). Thus, under operation of the engine, sulfur oxides (SOx) are also absorbed (or trapped) by the NOx-absorbing catalyzer units together with NOx in a similar absorption mechanism, which of course lowers the NOx-absorbing performance of the catalyzer units. In order to eliminate such sulfur poisoning (S-poisoning), it is necessary to heat up the NOx-absorbing agent to a certain releasing temperature. However, when, as is described above, the NOx-absorbing catalyzer units are arranged in a position where they can not introduce a sufficiently heated exhaust gas, releasing of the sulfur poisoning is impossible due to lack of the releasing temperature. Particularly, the NOx-absorbing agent with higher basicity tends to have a higher releasing temperature against sulfur poisoning, as compared with NOx-absorbing agent with lower basicity. Thus, in this case, releasing of sulfur poisoning from the NOx-absorbing agent having higher basicity is much difficult.

It is therefore an object of the present invention to provide an exhaust gas purifying system which is free of the above-mentioned shortcomings.

According to a first aspect of the present invention, there is provided an exhaust gas purification apparatus for an engine, which comprises a first NOx catalyst, disposed in a vicinity of an exhaust manifold of the engine, that traps NOx in a lean air-fuel ratio condition and releases trapped NOx in a stoichiometric or rich air-fuel ratio condition; a second NOx catalyst, disposed in a downstream side of the first NOx catalyst, that traps NOx in a lean air-fuel ratio condition and releases trapped NOx in a stoichiometric or rich air-fuel ratio condition, the second NOx catalyst showing a low basicity ability relative to the first NOx catalyst; and an exhaust passage that communicates the first NOx catalyst with the second NOx catalyst so that the second NOx catalyst is apart from the first NOx catalyst and that the second NOx catalyst is placed in a low temperature environment relative to the first NOx catalyst.

According to a second aspect of the present invention, there is provided an exhaust gas purification apparatus for an engine, which comprises a first NOx catalyst, disposed in a vicinity of an exhaust manifold of the engine, that traps NOx in a lean air-fuel ratio condition and releases trapped NOx in a stoichiometric or rich air-fuel ratio condition; a second NOx catalyst, disposed in a downstream side of the first NOx catalyst, that traps NOx in a lean air-fuel ratio condition and releases trapped NOx in a stoichiometric or rich air-fuel ratio condition, the second NOx catalyst showing a high reducing ability relative to the first NOx catalyst; and an exhaust passage that communicates the first NOx catalyst with the second NOx catalyst so that the second NOx catalyst is apart from the first NOx catalyst and that the second NOx catalyst is placed in a low temperature environment relative to the first NOx catalyst.

According to a third aspect of the present invention, there is provided an exhaust gas purifying system of an internal combustion engine, which comprises an exhaust passage extending from the engine through an exhaust manifold; a first NOx-trapping catalyzer unit disposed on an upstream part of the exhaust passage; a second NOx-trapping catalyzer unit disposed on a downstream part of the exhaust passage; and a structure that causes the first NOx-trapping catalyzer unit to be exposed to a relatively high temperature environment and causes the second NOx-trapping catalyzer unit to be exposed to a relatively low temperature environment, wherein each of the first and second NOx-trapping catalyzer units traps NOx when the exhaust gas applied thereto shows a leaner air/fuel ratio and releases and reduces NOx when the exhaust gas applied thereto shows a stoichiometric or richer air/fuel ratio, and wherein the first NOx-trapping catalyzer unit shows the basicity that is higher than that of the second NOx-trapping catalyzer unit.

According to a fourth aspect of the present invention, there is provided an exhaust gas purifying system of an internal combustion engine, which comprises an exhaust passage extending from the engine through an exhaust manifold; a first NOx-trapping catalyzer unit disposed on an upstream part of the exhaust passage; a second NOx-trapping catalyzer unit disposed on a downstream part of the exhaust passage; and a structure that causes the first NOx-trapping catalyzer unit to be exposed to a relatively high temperature environment and causes the second NOx-trapping catalyzer unit to be exposed to a relatively low temperature environment, wherein each of the first and second NOx-trapping catalyzer units traps NOx when the exhaust gas applied thereto shows a leaner air/fuel ratio and releases NOx when the exhaust gas applied thereto shows a stoichiometric or richer air/fuel ratio, and wherein the first NOx-trapping catalyzer unit has a low reducing ability as compared with the second NOx-trapping catalyzer unit, so that the first NOx-trapping catalyzer unit exhibits NOx-trapping performance to the extent of a high temperature as compared with the second NOx-trapping catalyzer unit.

BRIEF DESCRIPTION OF THE DRAWINGS

FIG. 6 is a graph showing a relationship between a vehicle speed and the temperature of the inlet portion of the NOx-trapping catalyzer unit.

DETAILED DESCRIPTION OF THE EMBODIMENT

Figure 1:
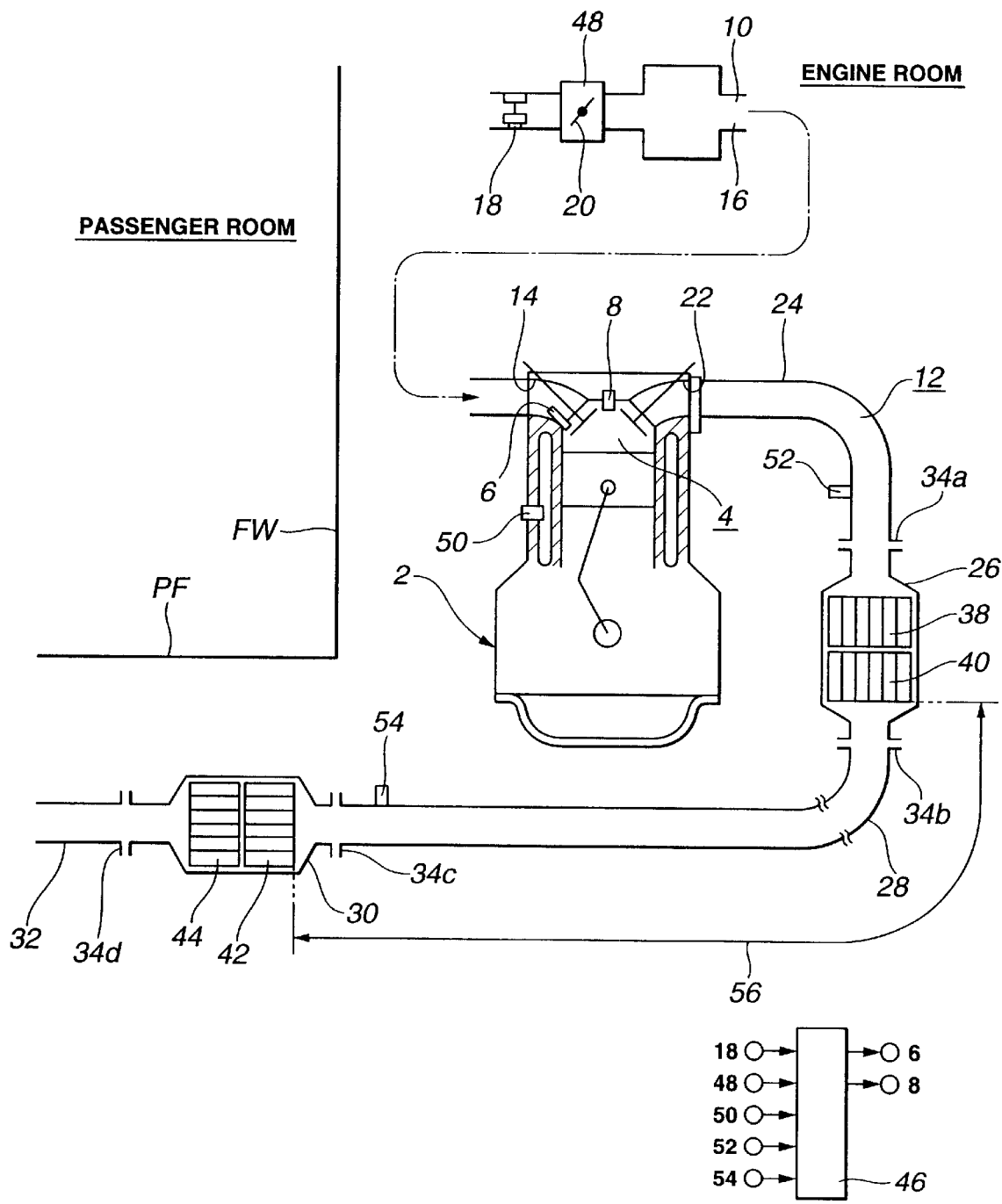
FIG. 1 is a schematic view of an exhaust gas purifying system of an internal combustion engine, according to the present invention.

Referring to FIG. 1, there is shown an exhaust gas purifying system of an internal combustion engine, according to the present invention.

In the drawing, denoted by numeral 2 is a gasoline direct injection (GDI) type internal combustion engine to which the exhaust gas purifying system of the invention is practically applied. In this engine 2, each fuel injection valve 6 is so arranged as to directly inject fuel into the corresponding combustion chamber. In each combustion chamber 4, there is arranged an ignition plug 8 to ignite air/fuel mixture provided in the chamber 4. An intake passage 10 for introducing air leads to the combustion chamber 4 and an exhaust passage 12 for discharging exhaust gas extends from the combustion chamber 4.

The intake passage 10 generally comprises an intake port 14 formed in the engine 2 and an intake system section 16 including an intake manifold mounted to one side wall of the engine 2 where the intake port 14 is exposed. In the intake system section 16, there are arranged an air flow meter 18 and a throttle valve 20, as shown.

While, the exhaust passage 12 generally comprises an exhaust port 22 formed in the engine 2, an exhaust manifold 24 mounted to another side wall of the engine 2 where the exhaust port 22 is exposed, an upstream converter casing 26 connected to an outlet of the exhaust manifold 24, a connecting tube 28 extending from the upstream converter casing 26, a downstream converter casing 30 connected to an outlet of the connecting tube 28 and an exhaust tube 32 extending from an outlet of the downstream converter casing 30. These members 24, 26, 28, 30 and 32 are connected to one another through respective flange members 34a, 34b, 34c and 34d as shown.

In the upstream converter casing 26, there are installed an upstream three-way catalyzer unit 38 and an upstream NOx-trapping catalyzer unit 40, and in the downstream converter casing 30, there are installed a downstream NOx-trapping catalyzer unit 42 and a downstream three-way catalyzer unit 44, as shown. That is, in each converter casing 26 or 30, two different catalyzer units (38, 40) or (42, 44) are installed in tandem.

A control unit 46 is employed for controlling operation of the engine 2, that is, for controlling the fuel injection amount, fuel injection timing and ignition timing. The control unit 46 is a digital computer comprising known CPU, RAM, ROM and input and output interfaces. Information signals from the air flow meter 18, a throttle open degree sensor 48, a cooling water temperature sensor 50, an engine speed sensor and first and second air/fuel ratio sensors (viz., oxygen sensors) 52 and 54 are all inputted into the control unit 46 for optimally controlling the engine 2. As shown, the throttle open degree sensor 48 is arranged in the intake passage 10 to detect the open degree of the throttle valve 20, the first air/fuel ratio sensor 52 is arranged in the exhaust passage 12 at a position just upstream of the upstream converter casing 26 and the second air/fuel ratio sensor is arranged in the exhaust passage 12 at a position just upstream of the downstream converter casing 30.

Figure 2:
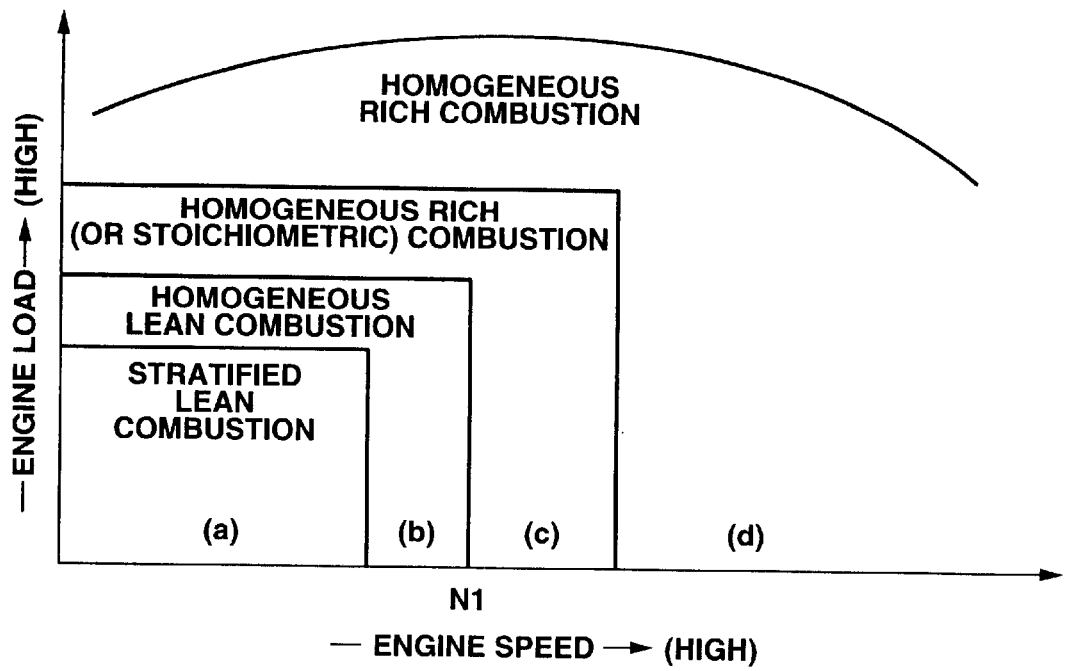
FIG. 2 is a control map used for setting a target air/fuel ratio.

In FIG. 2, there is shown a control map used for setting a target air/fuel ratio of a mixture which is to be combusted in the combustion chamber 4, whose abscissa indicates the engine speed and ordinate indicates the engine load. As is shown by this map, in a low-load and low-speed operation range (a), a stratified combustion of leaner mixture (viz., $\lambda>1$) is made by carrying out the fuel injection in the compression stroke at a timing just before the ignition. In a middle-load and middle-speed operation range (b), a homogeneous combustion of leaner mixture (viz., $\lambda>1$) is made by carrying out the fuel injection in the intake stroke. In a high-load and high-speed operation range (c) or (d), a homogenous combustion of stoichiometric or richer mixture (viz., $\lambda=1$ or, $\lambda<1$) is made by carrying out the fuel injection in the intake stroke. As is seen from this map, in a lower engine speed operation range lower than a given engine speed "N1", combustion of leaner mixture is carried out.

Referring back to FIG. 1, each of the upstream and downstream NOx-trapping catalyzer units 40 and 42 is so made as to trap NOx in the exhaust gas when the exhaust gas shows a higher (or leaner) air/fuel ratio and to release NOx therefrom when the exhaust gas shows a stoichiometric or lower (or richer) air/fuel ratio. The released NOx is reduced with the aid of HC and CO contained in the exhaust gas. That is, the released NOx becomes purified by using the unburned HC and CO as reducing agents. Each of the NOx-trapping catalyzer units 40 and 42 comprises a honeycomb carrier whose exposed surfaces are coated with noble metals (Pt or the like) and NOx-trapping agent.

In place of the above-mentioned NOx-trapping catalyzer units 40 and 42, other type NOx-trapping catalyzer unit may be used, which is for example a type that releases NOx under existence of reducing agents (HC and CO) in the exhaust gas. That is, the catalyzer for the unit 40 or 42 may be of any type that can trap NOx via absorption mechanism or adsorption mechanism. Thus, in fact, the unit 40 or 42 may be referred to as NOx-trapping or NOx-absorbing catalyzer unit. However, for ease of description, the unit 40 or 42 will be referred to as NOx-trapping catalyzer unit throughout the description.

The NOx-trapping catalyzer for the unit 40 or 42 contains at least one of the following elements which are cesium (Cs), sodium (Na), potassium (K), lithium (Li) (these are alkali metal elements), barium (Ba), calcium (Ca) (these are alkaline earth elements), lanthanum (La) and yttrium (Y) (these are rare earth elements).

It is to be noted that the basicity of the upstream NOx-trapping catalyzer unit 40 is set higher than that of the downstream NOx-trapping trapping unit 42. That is, the catalyzer for the upstream unit 40 is mainly constructed of at least one of alkali metal elements which show higher basicity (viz., lower reducing ability), while the catalyzer for the downstream unit 42 is mainly constructed of at least one of alkaline earth elements and/or rare earth elements, which show lower basicity (viz., higher reducing ability). In place of this measure, the amount of NOx-trapping agent for the upstream unit 40 may be larger than that for the downstream unit 42.

In general, basicity is an indicator for indicating the degree of ionization potential. That is, when showing higher basicity, the agent has a higher ability of becoming positive ions, that is, the ability of catching NOx⁻ which is a negative ion. Thus, with increase in basicity, the agent can trap a larger amount of NOx. This NOx-trapping ability becomes lowered with increase of temperature. However, when having a higher basicity, the agent can hold NOx⁻ for a longer time even in a high temperature environment as compared with the case having a lower basicity.

Figure 3:
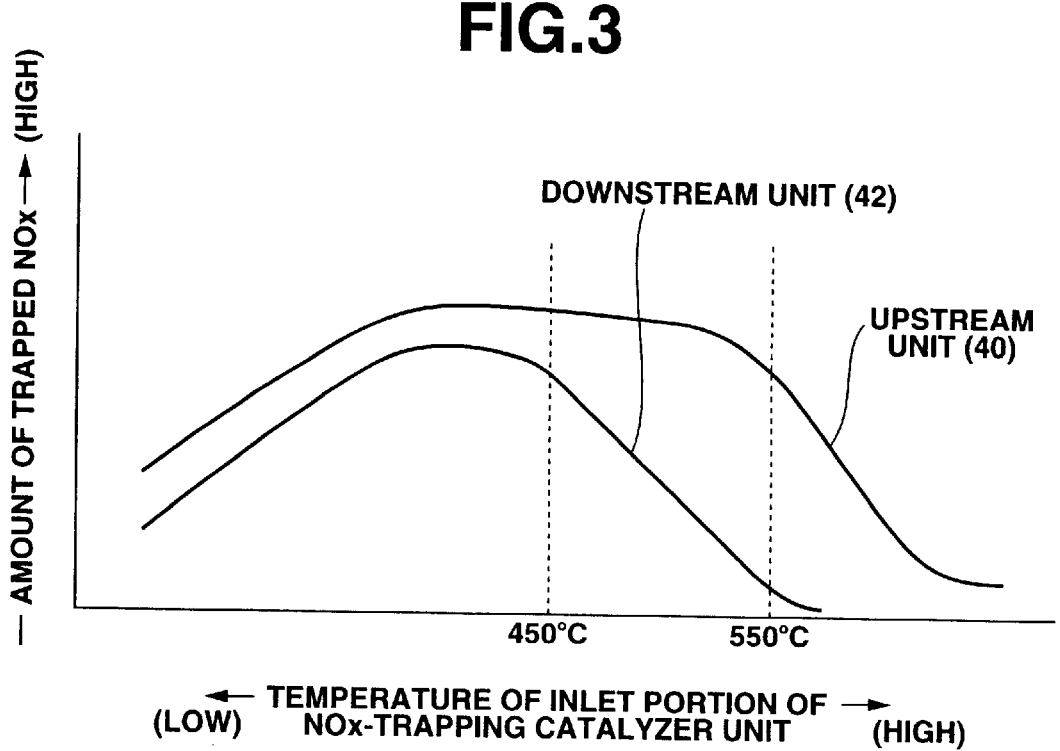
FIG. 3 is a graph showing a relationship between the temperature of an inlet portion of a NOx-trapping catalyzer unit and the amount of NOx trapped by the catalyzer unit.

FIG. 3 is a graph showing a relationship between the temperature of an inlet portion of the NOx-trapping catalyzer unit 40 or 42 and the amount of NOx trapped by the unit 40 or 42. As is seen from this graph, in case of the upstream NOx-trapping catalyzer unit 40 whose basicity (for example, the basicity of cesium (Cs) contained therein) is relatively high, the NOx-trapping ability is effectively held until about 550° C., while, in case of the downstream NOx-trapping catalyzer unit 42 whose basicity (for example, the basicity of barium (Ba) contained therein) is relatively low, the NOx-trapping ability shows a drop at about 450° C.

That is, in the invention, the upstream NOx-trapping catalyzer unit 40 shows the effective NOx-trapping ability to the extent of a higher temperature as compared with the downstream NOx-trapping catalyzer 42. Both of the units 40 and 42 have a lower limit of about 350° C. in the NOx-trapping ability.

Figure 4:
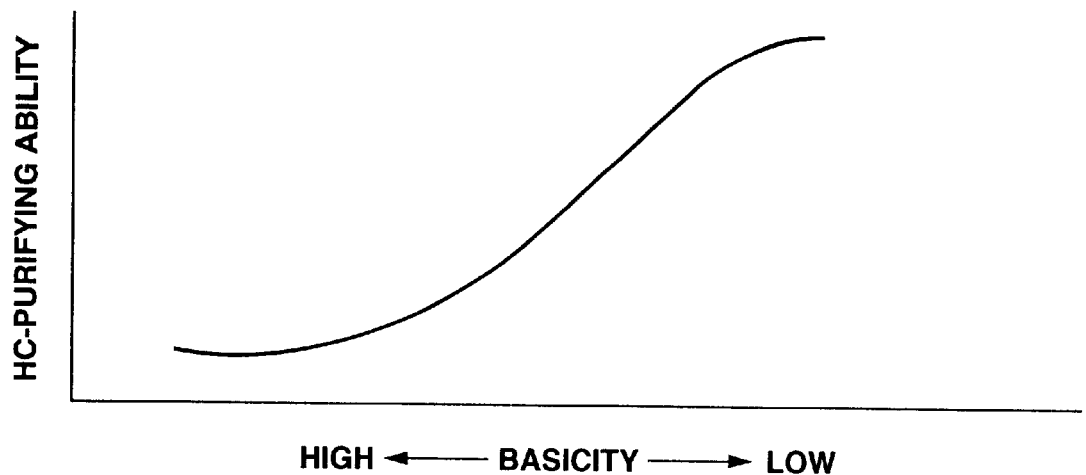
FIG. 4 is a graph showing a relationship between the basicity of the NOx-trapping catalyzer unit and HC-purifying ability of the catalyzer unit.
Figure 5:
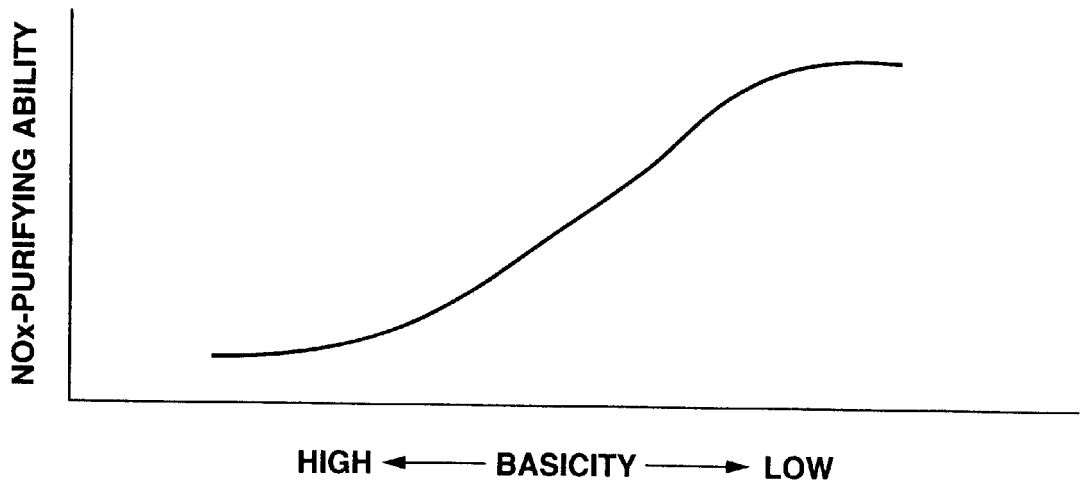
FIG. 5 is a graph showing a relationship between the basicity of the NOx-trapping catalyzer unit and NOx-purifying ability of the catalyzer unit.

FIG. 4 shows a relationship between the basicity of the NOx-trapping catalyzer unit 40 or 42 and HC-purifying ability, and FIG. 5 shows a relationship between the basicity of the NOx-trapping catalyzer unit 40 or 42 and NOx-purifying ability. As is seen from these graphs, when the basicity is lowered, HC-purifying ability and NOx-purifying ability (viz., NOx-reducing ability) are both increased.

That is, in the invention, the downstream NOx-trapping catalyzer unit 42 has a higher reducing ability than the upstream NOx-trapping catalyzer unit 40. The downstream NOx-trapping catalyzer unit 42 thus has a sufficient reducing ability. Although the upstream NOx-trapping catalyzer unit 40 thus has a relatively low reducing ability, the NOx-trapping ability of the same is sufficiently obtained because the basicity of the same is set high.

Referring back to FIG. 1, the upstream converter casing 26 is positioned just beside the engine 2, more specifically, just downstream of the exhaust manifold 24. While, the downstream converter casing 30 is positioned below a passenger room floor, as shown. Denoted by reference FW is a fire wall arranged between the engine room and the passenger room. The connecting tube 28 extends from the upstream casing 26 to the downstream casing 30, that is, from the engine room to the position below the floor of the passenger room. Thus, between the upstream and downstream NOx-trapping catalyzer units 40 and 42, there is provided a so-called heat mass 56 of a given length. Preferably, the length of the heat mass 56 is greater than 1000 mm. Actually, the heat mass 56 comprises the connecting tube 28, the flange members 34b and 34c and the second air/fuel ratio sensor 54. In case, the desired heat mass is secured, the connecting tube 28 and the downstream casing 30 can be formed into a single piece construction.

With the above-mentioned arrangement, the three-way catalyzer unit 38 and the NOx-trapping catalyzer unit 40, which are both installed in the upstream casing 26, are easily heated by the exhaust gas due to the higher temperature of the engine room, and thus, these two units 38 and 40 can be held at a relatively high temperature. While, the other NOx-trapping catalyzer unit 42 and the other three-way catalyzer unit 44, which are installed in the downstream casing 30, are not easily heated by the exhaust gas because they are positioned outside of the engine room (viz., below the passenger room floor) and the heat mass 56 functions to lower the temperature of the exhaust gas., and thus, these two units 42 and 44 are held at a relatively low temperature.

FIG. 6 shows the characteristics of the upstream and downstream NOx-trapping catalyzer units 40 and 42 in terms of a relationship between the vehicle speed (or engine speed) and the temperature of the inlet portion of the units 40 and 42. As is seen from this graph, under operation of the engine, there appears a certain temperature difference "ΔT" between the two units 40 and 42. The NOx-trapping range of the upstream unit 40 is set at a higher temperature side (viz., about 550° C.), and the NOx-trapping range of the downstream unit 42 is set at a lower temperature side (viz., about 450° C.).

Accordingly, in a lower speed operation range in which the engine speed is lower than a middle-speed "N1" and thus the engine tends to carry out a lean operation (viz., engine operation which produces exhaust gas whose air/fuel ratio is lean), at least one of the upstream and downstream NOx-trapping catalyzer units 40 and 42 can assuredly adsorb or trap NOx in the exhaust gas. That is, in a low-speed and lean-combustion operation condition of the engine, like in a cold engine condition just after the engine starting, the upstream unit 40 of the two 40 and 42 can reach its activation temperature fast and thus NOx in the exhaust gas can be trapped by the unit 40 effectively. While, when the upstream unit 40 shows the temperature of the inlet portion that exceeds the NOx-trapping temperature (about 550° C.) like in a middle speed lean combustion operation condition, the downstream NOx-trapping catalyzer unit 42 would reach its activation temperature and thus thereafter NOx in the exhaust gas can be trapped by the unit 42 effectively.

The upstream unit 40 is easily heated up by the exhaust gas for the above-mentioned reasons. Accordingly, when the engine operation is shifted to a richer (or stoichiometric) operation mode, the upstream unit 40 can be instantly heated up to the S-poisoning releasing temperature "T1". That is, since, in the two NOx-trapping catalyzer units 40 and 42, at least the upstream unit 40 can be assuredly and instantly released from the sulfur poisoning, deterioration of the NOx-trapping performance by the sulfur poisoning is effectively suppressed.

As is seen from FIG. 6, the S-poisoning releasing temperature varies in accordance with the characteristics (for example, basicity, reducing ability, etc.,) of the catalyzer. In the invention, the downstream unit 42 shows a lower S-poisoning releasing temperature "T2" than that "T1" of the upstream unit 40. Accordingly, even the downstream unit 42, which is relatively low in temperature, can be easily released from the sulfur poisoning.

In the four catalyzer units 38, 40, 42 and 44, the most-upstream unit 38 (viz., three-way catalyzer unit) is constructed to exhibit the gas purifying performance when the exhaust gas is not sufficiently heated. For this purpose, the amount of ceria carried by the unit 38 is smaller than that carried by the most-downstream unit 44 (viz., three-way catalyzer unit), so that the oxygen storage ability of the unit 38 is lower than that of the unit 44. Accordingly, even when the exhaust gas from the engine is not sufficiently heated, the most-upstream three-way catalyzer unit 38 can be activated instantly, and when reducing agents such as HC and CO are applied to the unit 38 in a rich combustion operation, the unit 38 can feed the two NOx-trapping catalyzer units 40 and 42 with the reducing agents without excessively purifying the reducing agents.

In the four catalyzer units 38, 40, 42 and 44, the most-downstream unit 44 (viz., three-way catalyzer unit) is constructed to assuredly purify the reducing agents (viz., HC and CO) and NOx which have not been purified by the other three catalyzer units 38, 40 and 42. For this purpose, the amount of ceria carried by the unit 44 is increased as compared with the upstream unit 38 and thus the oxygen storage ability of the unit 44 is increased.

Preferably, the three-way catalyzer for the unit 38 is made of palladium (Pd) or the like which shows the activity at a relatively low temperature, the NOx-trapping catalyzer for the unit 40 is made of platinum (Pt), cesium (Cs) or the like which exhibits NOx-trapping ability at a relatively high temperature, the NOx-trapping catalyzer for the unit 42 is made of barium (Ba) or the like which shows the activity at a relatively low temperature and the three-way catalyzer for the unit 44 is made of platinum (Pt), cesium (Cs), fixed ceria or the like which exhibits a satisfied oxygen storage ability.

As is described hereinabove, in the present invention, the four different catalyzer units 38, 40, 42 and 44 are arranged at certain positions, so that the exhaust gas from the engine is effectively and assuredly purified in a wide temperature range of the exhaust gas and in a wide operation range (viz., from lean combustion mode to rich combustion mode) of the engine.

In the following, the present invention will be summarized.

That is, the upstream (or first) and downstream (or second) NOx-trapping catalyzer units 40 and 42 are arranged on the exhaust passage 12. Each of the catalyzer units 40 and 42 is constructed to trap NOx when the exhaust gas applied thereto shows a leaner air/fuel ratio and releases and reduces NOx when the exhaust gas applied thereto shows a stoichiometric or richer air/fuel ratio.

The characteristics of these two NOx-trapping catalyzer units 40 and 42 are different from each other. That is, the basicity of the upstream catalyzer unit 40 is higher than that of the downstream catalyzer unit 42, or the NOx reducing ability of the upstream catalyzer unit 40 is lower than that of the downstream catalyzer unit 42, so that the upstream catalyzer unit 40 can exhibit effective NOx-trapping performance to the extent of a high temperature as compared with the downstream catalyzer unit 42.

In order to provide the two NOx-trapping catalyzer units 40 and 42 with different temperatures, the upstream catalyzer unit 40 is positioned near the exhaust manifold of the engine 2 and the downstream catalyzer unit 42 is positioned below the floor "PF" of the passenger room or the downstream catalyzer unit 42 is positioned sufficiently remote from the upstream catalyzer unit 40 to allow the connecting tube 28 between the two units 40 and 42 to act as a so-called "heat mass".

With the above, in almost all engine operation range wherein the exhaust gas shows leaner air/fuel ratio, at least one of the upstream and downstream NOx-trapping catalyzer units 40 and 42 can effectively trap NOx. In other words, the NOx-trapping is effectively carried out in a wider engine operation range.

That is, in case of the direct gasoline injection (DGI) engine that carries out a lean-burn operation, NOx is trapped mainly by the upstream NOx-trapping catalyzer unit 40 in a low-speed and lean combustion operation. While, when, due to a middle-speed and lean combustion operation, the upstream catalyzer unit 40 is excessively heated, NOx is trapped mainly by the downstream NOx-trapping catalyzer unit 42.

The upstream three-way catalyzer unit 38 is positioned upstream of the upstream NOx-trapping catalyzer unit 40, and the downstream three-way catalyzer unit 44 is positioned downstream of the downstream NOx-trapping catalyzer unit 42. The oxygen storage ability of the upstream three-way catalyzer unit 38 is set lower than that of the downstream three-way catalyzer unit 44, or the amount of ceria carried by the upstream three-way catalyzer unit 38 is smaller than that carried by the downstream three-way catalyzer unit 44.

With this, in a cold engine operation like the operation just after the engine starting, the upstream three-way catalyzer unit 38 can reach its activation temperature fast to purify the exhaust gas. Furthermore, when reducing agents (HC and CO) are applied to the unit 38 in a rich combustion operation, the unit 38 can feed the two NOx-trapping catalyzer units 40 and 42 with the reducing agents without excessively purifying the reducing agents. The downstream three-way catalyzer unit 44 can assuredly purify the reducing agents (viz., HC and CO) and NOx which have not been purified by the other three catalyzer units 38, 40 and 42.

In order to provide the two NOx-trapping catalyzer units 40 and 42 with different basicity or reducing ability, the catalyzer of the upstream unit 40 contains at least one of alkali metal elements and the catalyzer of the downstream unit 42 contains at least one of alkaline earth elements and rare earth elements. In place of this, the amount of alkali metal elements or alkaline earth elements and rare earth elements which are contained in the catalyzer of the upstream NOx-trapping catalyzer unit 40 is less than that of alkali metal elements or alkaline earth elements and rare earth elements which are contained in the catalyzer of the downstream NOx-trapping catalyzer unit 42.

As is described hereinabove, due to provision of the two NOx-trapping catalyzer units 40 and 42 which are different in characteristics and arrangement, in a wider engine operation range wherein the exhaust gas shows a leaner air/fuel ratio, the NOx is effectively trapped by the units 40 and 42.

Furthermore, in case of using the two NOx-trapping catalyzer units 40 and 42 and the two three-way catalyzer units 38 and 44 which are different in characteristics and arrangement, in a wider engine operation range, that is, from low temperature to high temperature operation range and from lean combustion operation to rich combustion operation range, assured and effective purification to the exhaust gas is carried out.

The entire contents of Japanese Patent Application 2000-133191 (filed May 2, 2000) are incorporated herein by reference.

Although the invention has been described above with reference to the embodiment of the invention, the invention is not limited to such embodiment as described hereinabove. Various modifications and variations of the embodiment may be carried out by those skilled in the art, in light of the above description.

What is claimed is:

1. An exhaust gas purification apparatus for an engine, comprising:
   a first NOx catalyst, disposed in a vicinity of an exhaust manifold of the engine, that traps NOx in a lean air-fuel ratio condition and releases trapped NOx in a stoichiometric or rich air-fuel ratio condition;
   a second NOx catalyst, disposed in a downstream side of the first NOx catalyst, that traps NOx in a lean air-fuel ratio condition and releases trapped NOx in a stoichiometric or rich air-fuel ratio condition, the second NOx catalyst showing a low basicity ability relative to the first NOx catalyst; and
   an exhaust passage that communicates the first NOx catalyst with the second NOx catalyst so that the second NOx catalyst is apart from the first NOx catalyst and that the second NOx catalyst is placed in a low temperature environment relative to the first NOx catalyst,
   wherein the first NOx catalyst contains at least one substance selected from alkali metals comprising cesium (Cs), sodium (Na), potassium (K), and lithium (Li).

2. An exhaust gas purification apparatus for an engine, comprising:
   a first NOx catalyst, disposed in a vicinity of an exhaust manifold of the engine, that traps NOx in a lean air-fuel ratio condition and releases trapped NOx in a stoichiometric or rich air-fuel ratio condition;
   a second NOx catalyst, disposed in a downstream side of the first NOx catalyst, that traps NOx in a lean air-fuel ratio condition and releases trapped NOx in a stoichiometric or rich air-fuel ratio condition, the second NOx catalyst showing a low basicity ability relative to the first NOx catalyst; and
   an exhaust passage that communicates the first NOx catalyst with the second NOx catalyst so that the second NOx catalyst is apart from the first NOx catalyst and that the second NOx catalyst is placed in a low temperature environment relative to the first NOx catalyst,
   wherein the first NOx catalyst is a cesium series catalyst, and wherein the second NOx catalyst is a barium series catalyst.

3. An exhaust gas purification apparatus for an engine, comprising:
   a first NOx catalyst, disposed in a vicinity of an exhaust manifold of the engine, that traps NOx in a lean air-fuel ratio condition and releases trapped NOx in a stoichiometric or rich air-fuel ratio condition;
   a second NOx catalyst, disposed in a downstream side of the first NOx catalyst, that traps NOx in a lean air-fuel ratio condition and releases trapped NOx in a stoichiometric or rich air-fuel ratio condition, the second NOx catalyst showing a low basicity ability relative to the first NOx catalyst; and
   an exhaust passage that communicates the first NOx catalyst with the second NOx catalyst so that the second NOx catalyst is apart from the first NOx catalyst and that the second NOx catalyst is placed in a low temperature environment relative to the first NOx catalyst,
   wherein the first NOx catalyst contains at least one substance selected from alkali metals, and wherein the second NOx catalyst contains at least one substance selected from alkali earth metals and rare earth metals.

4. An exhaust gas purification apparatus as claimed in claim 3, wherein the engine is adapted to a vehicle, the first NOx catalyst being arranged in an engine room where the engine is installed and the second NOx catalyst being arranged under a floor of the vehicle.

5. An exhaust gas purification apparatus as claimed in claim 3, wherein the second NOx catalyst contains at least one substance selected from alkali earth metals comprising barium (Ba) and calcium (Ca), or at least one substance selected from rare earth metals comprising lanthanum (La) and yttrium (Y).

6. An exhaust gas purification apparatus as claimed in claimed in claim 3, wherein the first NOx catalyst is installed in a first converter housing, and wherein the first converter housing is coupled to the exhaust manifold.

7. An exhaust gas purification apparatus as claimed in claim 6, wherein the first NOx converter housing is connected to the exhaust passage through a flange.

8. An exhaust gas purification apparatus as claimed in claim 7, wherein the second NOx catalyst is installed in a second converter housing, and wherein the second converter housing is connected to the exhaust passage through a flange.

9. An exhaust gas purification apparatus as claimed in claim 7, wherein the second NOx catalyst is installed in a second converter housing that is formed into a single piece construction with the exhaust passage.

10. An exhaust gas purification apparatus as claimed in claim 3, further comprising a first three-way catalyst that is disposed at a position upstream of the first NOx catalyst.

11. An exhaust gas purification apparatus as claimed in claim 10, wherein the first three-way catalyst and the first NOx catalyst are commonly installed in a first converter housing.

12. An exhaust gas purification apparatus as claimed in claim 10, further comprising a second three-way catalyst that is disposed at a position downstream of the second NOx catalyst.

13. An exhaust gas purification apparatus as claimed in claim 12, wherein the first three-way catalyst has a low oxygen storage ability relative to the second three-way catalyst.

14. An exhaust gas purification apparatus as claimed in claim 13, wherein the first three-way catalyst carries a small amount of ceria relative to the second three-way catalyst.

15. An exhaust gas purification apparatus as claimed in claim 3, further comprising a second three-way catalyst that is disposed at a position downstream of the second NOx catalyst.

16. An exhaust gas purification apparatus as claimed in claim 15, wherein the second three-way catalyst and the second NOx catalyst are commonly installed in a second converter housing.

17. An exhaust gas purifying system of an internal combustion engine, comprising:
an exhaust passage extending from the engine through an exhaust manifold;
a first NOx-trapping catalyzer unit disposed on an upstream part of said exhaust passage;
a second NOx-trapping catalyzer unit disposed on a downstream part of said exhaust passage; and
a structure that causes said first NOx-trapping catalyzer unit to be exposed to a relatively high temperature environment and causes said second NOx-trapping catalyzer unit to be exposed to a relatively low temperature environment,
wherein each of said first and second NOx-trapping catalyzer units traps NOx when the exhaust gas applied thereto shows a leaner air/fuel ratio and releases and reduces NOx when the exhaust gas applied thereto shows a stoichiometric or richer air/fuel ratio, and
wherein said first NOx-trapping catalyzer unit shows the basicity that is higher than that of said second NOx-trapping catalyzer unit, in which the catalyzer of said first NOx-trapping catalyzer unit contains cesium system elements including cesium (Cs) and in which the catalyzer of said second NOx-trapping catalyzer unit contains barium system elements including barium (Ba).

18. An exhaust gas purifying system of an internal combustion engine, comprising:
an exhaust passage extending from the engine through an exhaust manifold;
a first NOx-trapping catalyzer unit disposed on an upstream part of said exhaust passage;
a second NOx-trapping catalyzer unit disposed on a downstream part of said exhaust passage; and
a structure that causes said first NOx-trapping catalyzer unit to be exposed to a relatively high temperature environment and causes said second NOx-trapping catalyzer unit to be exposed to a relatively low temperature environment,
wherein each of said first and second NOx-trapping catalyzer units traps NOx when the exhaust gas applied thereto shows a leaner air/fuel ratio and releases and reduces NOx when the exhaust gas applied thereto shows a stoichiometric or richer air/fuel ratio, and
wherein said first NOx-trapping catalyzer unit shows the basicity that is higher than that of said second NOx-trapping catalyzer unit,
in which the catalyzer of said first NOx-trapping catalyzer unit contains at least one of alkali metals elements, and in which the catalyzer of said second NOx-trapping catalyzer unit contains at least one of alkaline earth elements and rare earth elements.

19. An exhaust gas purifying system as claimed in claim 18, in which said alkali metal elements are cesium (Cs), sodium (Na), potassium (K) and lithium (Li), in which said alkaline earth elements are barium (Ba) and calcium (Ca) and in which said rare earth elements are lanthanum (La) and yttrium (Y).

20. An exhaust gas purifying system as claimed in claim 18, further comprising a first three-way catalyzer unit which is disposed on said exhaust passage at a position upstream of said first NOx-trapping catalyzer unit.

21. An exhaust gas purifying system as claimed in claim 20, further comprising a second three-way catalyzer unit which is disposed on said exhaust passage at a position downstream of said second NOx-trapping catalyzer unit.

22. An exhaust gas purifying system as claimed in claim 21, in which the oxygen storage ability of said first three-way catalyzer unit is lower than that of said second three-way catalyzer unit.

23. An exhaust gas purifying system as claimed in claim 21, in which the amount of ceria carried by said first three-way catalyzer unit is smaller than that carried by said second threeway catalyzer unit.

24. An exhaust gas purification apparatus for an engine, comprising:
a first NOx catalyst, disposed in a vicinity of an exhaust manifold of the engine, that traps NOx in a lean air-fuel ratio condition and releases trapped NOx in a stoichiometric or rich air-fuel ratio condition;
a second NOx catalyst, disposed in a downstream side of the first NOx catalyst, that traps NOx in a lean air-fuel ratio condition and releases trapped NOx in a stoichiometric or rich air-fuel ratio condition, the second NOx catalyst showing a high reducing ability relative to the first NOx catalyst; and
an exhaust passage that communicates the first NOx catalyst with the second NOx catalyst so that the second NOx catalyst is apart from the first NOx catalyst and that the second NOx catalyst is placed in a low temperature environment relative to the first NOx catalyst,
wherein the first NOx catalyst contains at least one substance selected from alkali metals comprising cesium (Cs), sodium (Na), potassium (K) and lithium (Li).

25. An exhaust gas purification apparatus for an engine, comprising:
a first NOx catalyst, disposed in a vicinity of an exhaust manifold of the engine, that traps NOx in a lean air-fuel ratio condition and releases trapped NOx in a stoichiometric or rich air-fuel ratio condition;

a second NOx catalyst, disposed in a downstream side of the first NOx catalyst, that traps NOx in a lean air-fuel ratio condition and releases trapped NOx in a stoichiometric or rich air-fuel ratio condition, the second NOx catalyst showing a high reducing ability relative to the first NOx catalyst; and an exhaust passage that communicates the first NOx catalyst with the second NOx catalyst so that the second NOx catalyst is apart from the first NOx catalyst and that the second NOx catalyst is placed in a low-temperature environment relative to the first NOx catalyst, wherein the first NOx catalyst is cesium series catalyst, and wherein the second NOx catalyst is barium series catalyst.

26. An exhaust gas purification apparatus for an engine, comprising:

a first NOx catalyst, disposed in a vicinity of an exhaust manifold of the engine, that traps NOx in a lean air-fuel ratio condition and releases trapped NOx in a stoichiometric or rich air-fuel ratio condition;

a second NOx catalyst, disposed in a downstream side of the first NOx catalyst, that traps NOx in a lean air-fuel ratio condition and releases trapped NOx in a stoichiometric or rich air-fuel ratio condition, the second NOx catalyst showing a high reducing ability relative to the first NOx catalyst; and an exhaust passage that communicates the first NOx catalyst with the second NOx catalyst so that the second NOx catalyst is apart from the first NOx catalyst and that the second NOx catalyst is placed in a low temperature environment relative to the first NOx catalyst, wherein the first NOx catalyst contains at least one substance selected from alkali metals, and wherein the second NOx catalyst contains at least one substance selected from alkali earth metals and rare earth metals.

27. An exhaust gas purification apparatus as claimed in claim 26, wherein the engine is adapted to a vehicle, the first NOx catalyst being arranged in an engine room where the engine is installed and the second NOx catalyst being arranged under a floor of the vehicle.

28. An exhaust gas purification apparatus as claimed in claim 26, wherein the second NOx catalyst contains at least one substance selected from alkali earth metals comprising barium (Ba) and calcium (Ca), or at least one substance selected from rare earth metals comprising lanthanum (La) and yttrium (Y).

29. An exhaust gas purification apparatus as claimed in claim 26, wherein the first NOx catalyst is installed in a first converter housing, and wherein the first converter housing is coupled to the exhaust manifold.

30. An exhaust gas purification apparatus as claimed in claim 29, wherein the first NOx converter housing is connected to the. exhaust passage through a flange.

31. An exhaust gas purification apparatus as claimed in claim 30, wherein the second NOx catalyst is installed in a second converter housing, and wherein the second converter housing is connected to the exhaust passage through a flange.

32. An exhaust gas purification apparatus as claimed in claim 30, wherein the second NOx catalyst is installed in a second converter housing that is formed into a single piece construction with the exhaust passage.

33. An exhaust gas purification apparatus as claimed in claim 26, further comprising a first three-way catalyst that is disposed at a position upstream of the first NOx catalyst.

34. An exhaust gas purification apparatus as claimed in claim 33, wherein the first three-way catalyst and the first NOx catalyst are commonly installed in a first converter housing.

35. An exhaust gas purification apparatus as claimed in claim 33, further comprising a second three-way catalyst that is disposed at a position downstream of the second NOx catalyst.

36. An exhaust gas purification apparatus as claimed in claim 35, wherein the first three-way catalyst has a low oxygen storage ability relative to the second three-way catalyst.

37. An exhaust gas purification apparatus as claimed in claim 36, wherein the first three-way catalyst carries a small amount of ceria relative to the second three-way catalyst.

38. An exhaust gas purification apparatus as claimed in claim 26, further comprising a second three-way catalyst that is disposed at a position downstream of the second NOx catalyst.

39. An exhaust gas purification apparatus as claimed in claim 38, wherein the second three-way catalyst and the second NOx catalyst are commonly installed in a second converter housing.

* * * * *